Jan. 26, 1932.   G. W. HEGEL   1,842,967
TEMPERATURE REGULATOR
Filed March 24, 1928
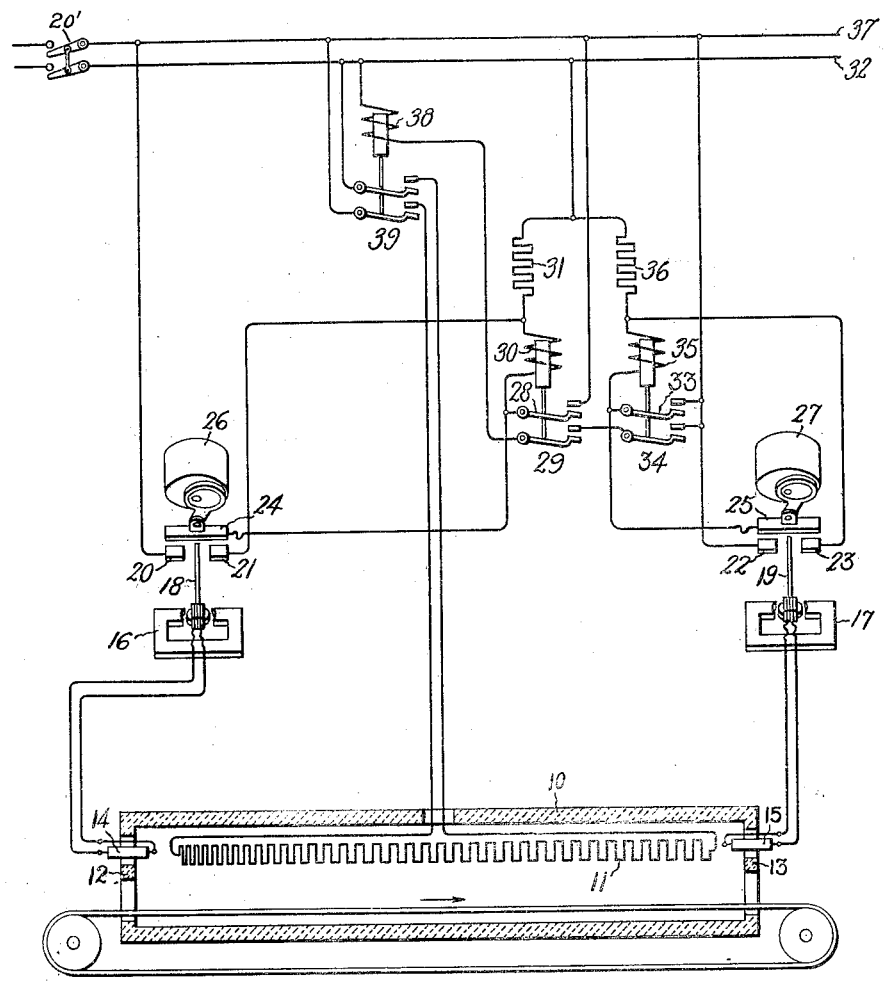
Inventor:
George W. Hegel,
by Charles E. Tullar
His Attorney.

Patented Jan. 26, 1932

1,842,967

UNITED STATES PATENT OFFICE

GEORGE W. HEGEL, OF SCHENECTADY, NEW YORK, ASSIGNOR TO GENERAL ELECTRIC COMPANY, A CORPORATION OF NEW YORK

TEMPERATURE REGULATOR

Application filed March 24, 1928. Serial No. 264,475.

My invention relates to temperature regulators, more particularly to temperature regulators for heating apparatus, such as furnaces of the elongated or tunnel type and the like, and has for its object the provision of regulating means whereby the generation of heat is controlled in accordance with the temperature prevailing in different portions of the furnace.

In furnaces of the conveyor type, for example, such as used in continuous annealing and continuous carburizing processes, the heating chamber is usually relatively long as compared to the height and the work enters at one end and is passed through the heating chamber on a conveying device and then out at the other end. Since the work or charge on entering the furnace is usually cold, it absorbs heat at a rapid rate and in order to take care of this the heating means is sometimes arranged to give a higher rate of heat generation at the incoming end of the furnace. The arrangement is such that notwithstanding the high rate of heat generation at the incoming end, the absorption of heat by the work maintains the temperature at that point much lower than at the outgoing end. However, if the work should be interrupted for an appreciable length of time a great increase in temperature would obviously follow at the incoming end which might well result in a temperature high enough to damage the work upon resumption of furnace operations.

In carrying out my invention in one form I provide temperature responsive control means at each end of the heating chamber so arranged that during the time that the work is passing substantially uniformly through it, the furnace will be controlled mainly, if not solely by the temperature responsive device located at the outgoing end to maintain a predetermined temperature at that end, but upon an interruption of the work and a resulting rise in temperature, the control means at the incoming end will take control to maintain a predetermined temperature, whereby an excessive temperature at the incoming end will be prevented.

For a more complete understanding of my invention reference should be had to the accompanying drawing, in the single figure of which is shown in diagrammatic form an electric furnace embodying my invention.

Referring to the drawing, I have shown my invention in one form as applied to an elongated furnace of the conveyor type, such as may be used in processes of continuous annealing or continuous carburizing, which is provided with suitable heating means such as a sinuous heating resistor 11, connected to a suitable source of electrical supply. A much higher rate of heat generation is provided at the incoming end where the work is introduced and as shown diagrammatically the resistor 11 has its convolutions arranged closer together at the left or incoming end 12 to provide for this higher rate. For purposes of illustration the incoming end 12 and the outgoing end 13 of the furnace are shown located opposite each other but it is to be understood that my invention need not be limited to a furnace of this type since other furnaces, such as the rotary hearth type can be controlled according to my invention.

Suitably mounted in the incoming end 12 of the furnace is a thermocouple 14 and similarly mounted in the outgoing end of the furnace is another thermocouple 15. Each of these thermocouples operates a suitable control device and, as shown, these control devices govern two switches which are connected in series with an operating coil for a main switch in circuit with the resistor 11, so that in case of the energization of either control device and a consequent opening of the switch controlled thereby, the circuit to the resistor 11 will be opened.

As shown, these control devices are of a well-known type such as disclosed in U. S. Patent 1,391,996 to Edgar F. Collins dated September 27, 1921. The thermocouples 14 and 15 are connected respectively to galvanometers 16 and 17, the pointers 18 and 19 of which move in front of or across pairs of stationary contacts 20, 21, 22 and 23, but without touching them. The stationary contacts are adjustable, each pair being adjustable along the scale of its corresponding pointer, the contacts of each pair being adjustable with relation to each other. Operating in conjunction with the pointers 18 and 19 respectively, are reciprocating contacts 24 and 25 which are each adapted to move in close proximity to but without touching the adjacent pair of stationary contacts and pinch momentarily the respective pointer when it is in front of one of its stationary contacts. The reciprocating contacts are actuated slowly by any suitable means, such as by constant speed electric motors 26, 27, the contacts 24 and 25 being operatively connected to eccentric driving members on the motor shafts, as shown in the drawing. The reciprocating contact member 24 is connected to the upper movable contact 28 of a switch 29 and also through the operating winding 30 for the switch 29, and a resistance 31 to the lower bus bar 32 of a suitable source of electrical supply. The movable contact 25 likewise is connected to the upper movable contact 33 of switch 34, and also through an operating winding 35 for the switch 34 and resistance 36 to the lower bus bar 32 of the supply source. The contacts 21 and 23 are connected respectively to the upper ends of the windings 30 and 35. The contact 22 is connected to both fixed contacts of the switch 34 and also to the upper bus bar 37 of the supply source. The lower contacts of switch 29 and the lower contacts of switch 34 are connected in series with the solenoid winding 38. This solenoid winding 38 is adapted to actuate the main switch 39 which connects the heating resistor 11 to the bus bars 32 and 37.

As thus constructed and arranged the operation of my invention is as follows: The stationary contacts 20 and 21 are adjusted so that they will be equidistant from the pointer 18 when a predetermined means temperature prevails at the incoming end 12 of the furnace 10. Similarly contacts 22 and 23 are adjusted so that they are equidistant from the pointer 19 when a predetermined mean temperature exists at the outgoing end 13 of furnace 10.

Assuming that the furnace is cold the galvanometer coils will not be energized and the pointers 18 and 19 will be over the contacts 20 and 22 respectively. If now the switch 20' is closed and the motors 26 and 27 started, current will flow from the upper bus bar to the movable contact member 24 when pointer 18 is pinched between contact members 20 and 24, thence through operating winding 30 and resistance 31 to the lower bus bar. Simultaneously, current will flow momentarily from the upper bus bar contact 22 and pointer 19 to the movable contact 25, and thence through winding 35 and resistance 36 to the lower bus bar. On the energization of coils 30 and 35, switches 29 and 34 will be closed and holding circuits will be established for each coil through the upper contacts of the switches 29 and 34. The closing of both switches 29 and 34 will establish a circuit through coil 38 and the main switch 39 will be closed, thus energizing resistor 11.

The furnace will now heat up and a predetermined mean temperature will be maintained in the furnace, the pointers 18 and 19 moving between contacts 20, 21 and 22, 23 in response to changes in temperature to energize or deenergize the resistor 11. Upon the introduction of the work, since the heat will be absorbed much more rapidly at the incoming end 12, the temperature at this end of the furnace will remain below that at the outgoing end, in fact below the predetermined temperature. Under these conditions the resistor will be controlled mainly by the thermocouple 15 since the temperature in the outgoing end of the furnace is the higher and the furnace is consequently regulated in accordance with this higher temperature. If the temperature at the outgoing end should increase beyond a predetermined amount the pointer 19 will move over the contact 23 and the operating coil 35 will be short circuited, thus causing the switch 34 to open. The opening of switch 34 causes the circuit through operating winding 38 to be broken and the main switch 39 will open allowing the resistor 11 to cool.

Let us now assume that the furnace is in operation with the switch 39 closed and that the work is interrupted for an appreciable time. The temperature at the incoming end 12 of the furnace will rise above the temperature at the outgoing end 13, due to the concentration of heat by the resistor at the incoming end. If the temperature at the incoming end thus increases above the predetermined value, the thermocouple 14 will cause the pointer 18 of the control device 18 to move over contact 21 and the operating coil 30 will be short circuited thus causing switch 29 to open. The opening of switch 29 will cause the circuit through operating winding 38 to be broken in the same manner that the switch 34 causes this circuit to be opened when the temperature at the outgoing end of the furnace increases beyond a predetermined value.

From the forgoing explanation it will be seen that during the time that work is passing through the furnace, the thermocouple 15 and the control apparatus 17 and 34 associated therewith, will govern the switch 39 and consequently the resistor 11, since the cold work entering at end 12 will prevent the temperature at that end from rising too high. However, on an interruption of the work the temperature at the incoming end 12 will tend to rise due to the concentration of heat at that end of the resistor 11, but will be prevented from rising beyond a predetermined degree by the thermocouple 14 and its associated switch 29. Thus the furnace is controlled by the thermocouple in that end of the furnace which is at the higher temperature.

Although the invention is described as applied to a furnace in which the work enters at one end and leaves at another end, it should be understood that the invention is not limited to such a furnace but has many other uses. It may be utilized, for instance, in any furnace in which it is desired to regulate the heating means in accordance with the temperature prevailing at different positions in the furnace.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. In a temperature regulator for convey- or furnaces, the combination with a heating resistor therefor giving a higher rate of heat generation in the incoming end than in the outgoing end, of means responsive to the temperature in the outgoing end of said furnace for controlling said heating resistor to maintain a predetermined temperature in said outgoing end while work is being passed through said furnace, and means responsive to the temperature in the incoming end of said furnace for controlling said heating resistor to prevent an excessive rise in temperature upon an interruption in the supply of work to said furnace.

2. In a temperature regulator, the combination with a furnace in which material to be heated enters at one end of the furnace and leaves at another end of the furnace, of an electric heating element extending through said furnace between said ends giving a higher rate of heat generation in the incoming end than in the outgoing end and a temperature control means responsive to the temperature prevailing at each of said ends for maintaining the temperature of said heating element between predetermined limits.

3. In a temperature regulator, the combination with a furnace in which material to be heated enters at one end and leaves at another end, of an electric heating element extending from one of said ends to the other and connected to a suitable supply source, said heating element giving a higher rate of heat generation in the incoming end, than in the outgoing end, a temperature responsive device at each of said ends and controlling means associated with said device for opening the circuit to said heating element on a predetermined increase in temperature at either of said ends.

4. In a temperature regulator, the combination with an elongated furnace in which material to be heated enters at one end and leaves at another end, of a sinuous electric heating resistor having a plurality of turns and extending from one of said ends to the other and connected to a suitable supply source, the turns of said resistor being relatively closer together at one end of said furnace than at the other end, a temperature responsive device at each of said ends, controlling means associated with each of said devices for opening the circuit to said heating element on a predetermined increase in temperature at either of said ends, and for closing said circuit when a predetermined decrease in temperature occurs at both of said ends.

5. In a temperature regulator, the combination with a furnace having an incoming end and an outgoing end, of temperature responsive devices located at each of said ends, heating means for said furnace giving a higher rate of heat generation at the incoming end than in the outgoing end and circuit controlling means associated with said temperature responsive devices and with said heating means so that said heating means will be controlled solely by one or the other of said temperature responsive devices depending upon the conditions of operation.

6. In a temperature regulator, the combination with an electric furnace having a heating chamber of heating means therefor providing for different rates of heat generation in different portions of said chamber, a plurality of temperature responsive devices having different temperature settings responsive respectively to the temperatures in said different portions for controlling said heating means so that the heat is cut off when any one of said devices attains its high limit temperature setting and is turned on only when all of said instruments have attained their low limit temperature settings.

7. In a temperature regulator, the combination with an electric furnace having a heating chamber, of heating means for said chamber providing different rates of heat generation in different portions of said chamber, switching means for controlling the power connections for said heating means, a plurality of contactors for controlling said switching means connected so that said switching means operates to complete the power circuit only when all of said contactors are closed and operates to open said power circuit when any one of said contactors is opened and a plurality of temperature responsive devices responsive respectively to the temperatures in said different portions of said furnace for controlling said contactors.

8. In a temperature regulator for an electric furnace, the combination with electric resistance heating means therefor of switching means for controlling the power connections for said resistance heating means, a plurality of contactors for controlling the energizing circuit for said switching means so that said switching means is energized to complete a power circuit for said resistance heating means when all of said contactors are closed and so that said energizing circuit is interrupted when any one of said contactors is opened and a plurality of temperature responsive devices responsive to the temperature in different portions of said furnace for controlling said contactors, said temperature responsive devices having different temperature settings and being connected to control said contactors so that they are energized to close when all of said temperature responsive devices are at their lower limit temperature settings and each is deenergized to open when its associated temperature responsive device is at its high limit temperature setting.

9. In temperature regulators for conveyor furnaces, the combination with heating means for the furnace giving a higher rate of heat generation in the incoming end than in the outgoing end of a switch for controlling the power connections for said heating means, a pair of contactors for controlling said switch so that when both of said contactors are closed an energizing circuit is completed for said switch to close said power connections and when either of said contactors is open the energizing circuit for said switch is interrupted to open said power connections and a temperature responsive device at each of said ends for controlling said contactors respectively so that both of said contactors are closed when both of said temperature responsive devices are at their low limit temperature setting and each is opened when its associated temperature responsive device is at its high limit temperature setting.

10. In a temperature regulator, the combination with an electric furnace having a heating chamber in which the material to be heated enters at one portion and leaves at another portion, of a heating element for said chamber providing for a comparatively high rate of heat generation in said first portion and a comparatively low rate of heat generation in said second portion, a temperature responsive device responsive to the temperature prevailing in said second portion for controlling said heating element so as to maintain a substantially constant predetermined temperature in said second portion and a second temperature responsive device for controlling said heating element responsively to the temperature in said first portion so as to prevent an excessive temperature rise in said first portion irrespective of the temperature conditions in said second portion.

In witness whereof, I have hereunto set my hand this 23rd day of March, 1928.

GEORGE W. HEGEL.